UNITED STATES PATENT OFFICE 2,096,715
PROCESS OF PREPARING
DIHYDROJASMONE

Herbert L. J. Haller, Washington, D. C., and
Frederick B. La Forge, Arlington, Va.

No Drawing. Application February 26, 1937,
Serial No. 127,940

6 Claims. (Cl. 260—131)

(Granted under the act of March 3, 1883, as
amended April 30, 1928; 370 O. G. 757)

This application is made under the act of March 3, 1883, as amended by the act of April 20, 1928, and the invention described herein, if patented, may be manufactured and used by or for the Government for governmental purposes without the payment to us of any royalty thereon.

Our invention relates to dihydrojasmone and to processes of preparing this compound.

According to the present nomenclature, dihydrojasmone is 2-n-amyl-3-methyl-$\Delta^2$-cyclopentenone. It is represented by the formula:

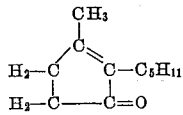

It is a colorless liquid boiling at 102.5° C. under 5-6 mm. pressure, substantially insoluble in water but soluble in the usual organic solvents such as ethyl alcohol, aromatic and aliphatic hydrocarbons, etc.

Dihydrojasmone is distinguished by its very pleasant odor in low concentrations and can be used with advantage as a perfume, as a component of a perfume or in combination with other substances to impart an agreeable odor.

It is known that the active insecticidal principles of pyrethrum flowers, pyrethrin I and pyrethrin II are esters of a keto alcohol, pyrethrolone, with chrysanthemum mono-carboxylic acid and chrysanthemum dicarboxylic acid methyl ester, respectively. Pyrethrolone has the same ring structure as dihydrojasmone but differs from it by having a hydroxyl group in place of one of the hydrogen atoms in position 5 in the nucleus and a doubly unsaturated five-membered side chain instead of the n-amyl group. It is represented by the formula:

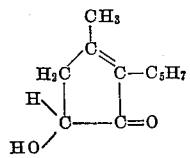

On catalytic hydrogenation the side chain is saturated and the hydroxyl group replaced by hydrogen resulting in the formation of dihydrojasmone. The same dihydrojasmone results from the hydrogenation of the methyl ether and the acetate of pyrethrolone.

We have found that dihydrojasmone is also formed together with the chrysanthemum acids when the pyrethrins are subjected to catalytic hydrogenation. Since the pyrethrins are accessible only with difficulty it is more practical to employ concentrates or oleo-resins, prepared as described in U. S. Patent 2,044,502 and/or U. S. Patent 2,050,974 in which the pyrethrins have been segregated and separated from gross impurities. Extracts prepared by the percolation or extraction of pyrethrum flowers with suitable solvents may also be hydrogenated in the presence of catalysts with the formation of dihydrojasmone and the chrysanthemum acids.

The reduction may be carried out in a number of suitable solvents either at room temperature or at higher temperatures and at atmospheric pressure or under higher pressures, for instance at 40 to 50 pounds per square inch. By suitable solvent is meant any solvent which of itself does not react with the catalyst.

Various catalysts may be employed, platinum oxide, colloidal platinum, palladium charcoal, colloidal palladium and Raney nickel catalyst, being particularly effective.

The following examples will further illustrate the nature of this invention but the invention is not restricted to the experimental conditions described.

Example I

Five grams of a concentrate that contained 80.8 percent pyrethrin II and about 4 percent pyrethrin I was dissolved in about 35 cc. ethanol and reduced in an atmosphere of hydrogen with 0.3 gram of reduced platinum oxide catalyst. The absorption of hydrogen was very rapid at first and about 300 cc. were absorbed in about 20 minutes. The absorption then continued at a slower rate until about 1200 cc. were taken up in the course of 7 hours after which the absorption had practically ceased. At this stage the solution was filtered and neutralized to phenolphthalein with 5 percent potassium hydroxide solution. Water was then added and the solution was extracted twice with petroleum ether. After removal of the solvent the residue was again subjected to hydrogenation with fresh catalyst. About 75 cc. of hydrogen were absorbed in 3 hours. On completion of the second reduction the reaction products were again separated into acid and neutral fractions. The latter fraction consisted of 2.1 grams of oil. This material was subjected to steam distillation and the volatile constituents that contained the dihydrojasmone separated from the nonvolatile impurities.

The dihydrojasmone may be further purified by the preparation of its semicarbazone in the usual manner and regeneration of the ketone by the usual procedure.

Example II

Five grams of a concentrate containing 54.4 percent of pyrethrin I and 11.5 percent of pyrethrin II was dissolved in about 35 cc. of ethanol and hydrogenated with 0.3 gram of reduced platinum oxide catalyst. About 300 cc. of hydrogen were absorbed in 10 minutes after which the reduction proceeded until about 900 cc. had been absorbed in 7 hours. The solution was filtered, neutralized with 5 percent potassium hydroxide solution and after addition of water, the neutral fraction was separated by extraction with petroleum ether. After removal of the solvent, the residue dissolved in ethanol was further hydrogenated with a fresh quantity of catalyst. In the second operation 400 cc. hydrogen were absorbed. The reaction product was separated into acid and neutral fraction in the usual manner. The neutral fraction (2.6 grams) was subjected to steam distillation and the volatile constituents which contain dihydrojasmone recovered from the distillate with petroleum ether. The yield was 1.65 grams. Further purification of the dihydrojasmone may be effected by the preparation of its semicarbazone and subsequent regeneration.

Example III

Five grams of a concentrate containing 53.4 percent pyrethrin I and 20.4 percent pyrethrin II dissolved in about 35 cc. ethanol at 35–40° C. was reduced with hydrogen in the presence of the Raney nickel catalyst. Absorption of hydrogen was rapid at first and then proceeded at a slower rate. After about 3 hours 800 cc. of hydrogen had been absorbed. At this stage the reduction was interrupted. The reaction product was divided into a neutral and acid fraction in the usual manner. The yield of the neutral fraction was 2.7 grams. This fraction which contains the dihydrojasmone may be used directly or further purified by the usual procedures.

Having thus described our invention, what we claim for Letters Patent is:

1. The process of making dihydrojasmone, which comprises hydrogenating an extract of pyrethrum flowers in the presence of a catalyst selected from the group consisting of platinum, palladium and nickel.

2. The process of making dihydrojasmone, which comprises hydrogenating oleoresins containing a mixture of pyrethrin I and pyrethrin II in the presence of a catalyst selected from the group consisting of platinum, palladium and nickel.

3. The process of making dihydrojasmone, which comprises hydrogenating pyrethrin I in an organic solvent in the presence of a catalyst selected from the group consisting of platinum, palladium and nickel.

4. The process of making dihydrojasmone, which comprises hydrogenating pyrethrin II in an organic solvent in the presence of a catalyst selected from the group consisting of platinum, palladium and nickel.

5. The process of making dihydrojasmone, which comprises hydrogenating pyrethrin I in the presence of a catalyst selected from the group consisting of platinum, palladium and nickel.

6. The process of making dihydrojasmone, which comprises hydrogenating pyrethrin II in the presence of a catalyst selected from the group consisting of platinum, palladium and nickel.

HERBERT L. J. HALLER.
FREDERICK B. LA FORGE.